United States Patent [19]

Van Antwerp et al.

[11] Patent Number: 4,943,357
[45] Date of Patent: Jul. 24, 1990

[54] PHOTODEGRADATION OF METAL CHELATE COMPLEXES

[75] Inventors: William P. Van Antwerp, Pacific Palisades, Calif.; Mark G. Steinmetz, Shorewood; Paul R. Goudy, Jr., Bayside, both of Wis.

[73] Assignee: Photo Redux Corp., Milwaukee, Wis.

[21] Appl. No.: 211,784

[22] Filed: Jun. 27, 1988

[51] Int. Cl.⁵ .............................................. B01J 19/12
[52] U.S. Cl. .............................. 204/157.15; 204/157.4; 204/157.46
[58] Field of Search ............ 204/157.4, 157.46, 157.15

[56] References Cited

U.S. PATENT DOCUMENTS 4,330,382  5/1982  Yardley et al. ................. 204/157.46

OTHER PUBLICATIONS

Natarajan, P.; Endicott, J. F. *J. Phys. Chem.* 1973, 77, 2049.
McLaren, A. D.; Shugar, D. "Photochemistry of Proteins and Amino Acids", Pergamon Press, N.Y., 1964, CH III.
Mittal, L. J.; Mittal, J. P.; Hayon, E. *Photochem. Photobiol.* 1973, 18, 281.
Johns, R. B.; Seuret, M. G. *Photochem. Photobiol.* 1972, 16, 413.
Johnson, L. W.; Maria, H. J.; McGlynn, S. P. *J. Chem. Phys.* 1971, 54, 3823.
Basch, H.; Robin, M. B.; Kuebler, N. A. *J. Chem. Phys.* 1968, 49, 5007.
Endicott, J. F. "Concepts in Inorganic Photochemistry", Adamson, A. W. and P. D. Fleischauer, Eds., Wiley, N.Y., 1975, pp. 81-142.
Bhat, T. R.; Krishnamurthy, M. J. *Inorg. Nucl. Chem.* 1963, 25 1147.
Kaiser, Grossi, Fischer, *Helv. Chim. Acta.*, 1978, 61, 223.
Von Sonntag, C.; Schuchmann, H.-P. *Adv. Photochem.* 1977, 10 59.
Motekaitis, R. J.; Cox III, X. B.; Taylor, P.; Martell, A. E.; Miles, B., Tvedt, T. J. *Can. J. Chem.* 1982, 60, 1207.

*Primary Examiner*—Kaplan G. L.
*Assistant Examiner*—Steven P. Marquis
*Attorney, Agent, or Firm*—Quarles & Brady

[57] ABSTRACT

A method of photodegrading a metallic chelate complex wherein ultraviolet light is directed into an aqueous solution of a metallic chelate to photodegrade the metallic chelate and isolate the metallic portion. The ultraviolet light has a wavelength of no greater than about 210 nm and the method is especially adapted for photodegrading metallic chelates in electroless nickel plating baths and metallic ethylenediamine triacetic acid to recover the metallic portions as well as reduce toxic waste.

12 Claims, No Drawings

PHOTODEGRADATION OF METAL CHELATE COMPLEXES

BACKGROUND OF THE INVENTION

This invention relates to the recovery of metal from metallic chelate complexes. More particularly, it relates to the photodegradation of metal chelates as well as the resulting photodegraded compounds using an ultraviolet light source having a wavelength no greater than 210 nm to isolate the metal portion.

There is a great need for treating chelated metals so as to be able to recover the metal portions therefrom. Currently, such chelated compounds are disposed of at landfill sites. This can cause an environmental problem and as importantly is a waste of metal when the metallic portion is an expensive metal such as nickel, copper or cobalt.

The prior art in a publication entitled "Photoredox Behavior of Transition of Metal-Ethylenediaminetetraacetate Complexes. A comparison of Some Group VIII Metals" examines the photoredox behavior of several metal-ethylenediaminetetraacetate complexes. This publication is by P. Natarajan and John F. Endicott published in the Journal of Physical Chemistry, Volume 77, No. 17, 1973. This publication states that the chromium, nickel and copper complexes are essentially inert to excitation wavelengths greater than or equal to 214 nm. In those instances where higher wavelengths have been successfully employed, an additional oxidant material has been required.

It has now been found that metallic chelates including nickel ethylenediaminetetraacetic acid (EDTA) can be photodegrated when subjected to a source of ultraviolet light having a wavelength of no greater than 210 nm. This is quite unexpected in view of the state of the art and particularly the foregoing prior art reference. Further, it has also been found that electroless nickel plating wastes can also be treated with ultraviolet light in the same wavelength parameters. The UV light breaks apart the chelating compound of a chelated nickel complex, reducing its ability to complex with the nickel and further progressively degrades the organic moieties into compounds of lower molecular weight. The freed metal can then be removed as either the oxide or the hydroxide compound.

It is an advantage of the present invention to provide a novel photodegradation method for metal chelate compounds to result in a recovery of the metallic portion.

Another advantage is a novel method for photodegrading metallic chelating compounds wherein the compounds are converted to materials of lower molecular weight.

Still another advantage is a method of the foregoing type wherein no additional chemical material is required for the effective use of the photodegrading process.

Yet another advantage is a method of the foregoing type which is economical to utilize based on electrical power requirements.

Still another advantage of this invention is a method of the foregoing type wherein the recoverable metallic product is a saleable material.

SUMMARY OF THE INVENTION

The foregoing advantages are accomplished and the shortcomings of the prior art are overcome by the present photodegradation method wherein an aqueous solution of a metallic chelate complex is subjected to ultraviolet light having a wavelength of no greater than about 210 nm. The metal portion of the chelate is recovered in the form of a metallic ion or as an inorganic compound.

In one embodiment, the metallic chelate is in the form of an electroless metal plating bath, and in another embodiment it is present as nickel EDTA.

In still other embodiments, the source of ultraviolet light is a low pressure mercury arc lamp and in another a laser or any other suitable UV source.

DETAILED DESCRIPTION OF PREFERRED EMBODIMENTS

The following Examples are presented to better illustrate the invention; however, they are not intended to limit the invention to the times, conditions or materials set forth.

Example 1

Photodegradation of Electroless Plating Baths and Ni EDTA

Two electroless nickel plating baths containing up to 5000 mg/l nickel (0.09 Molar), up to 52 g/l sodium hypophosphite (0.58 M), and up to 130 g/l of total organic acids, were photolyzed at wavelengths varying from 185 to 220 nm. The plating baths in each instance are proprietary with one sold as Nimuden DX electroless nickel plating bath from Uyemura International Corp. in Culver City, Calif. and the other as Enthone Ni 422 from Enthone Chemical Corp.

In addition, a solution of Ni EDTA and a sample of crystalline Ni EDTA were also photolyzed under the same conditions as the two electroless nickel baths.

A 500 ml aliquot was prepared of each of the samples. Approximately 15 ml was placed in a quartz reaction vessel and photolyzed for 24 hrs. using interference filters for wavelength selection. Photolysis was performed with a high pressure deuterium Hg lamp for wavelengths of 220, 210, 205 and 195 nm. Photolysis at 185 nm was performed using a low pressure Hg arc lamps. Wavelength selection was effected using interference filters with a 3 nm bandpass.

The photolyses of the electrolysis nickel complexes destroyed organic acids and created some new components. The photolyses of the EDTA complexes removed nickel from the solution and created some carboxylic acids.

As to the electrolysis plating baths, high performance liquid chromatography (HPLC) was performed on the resulting photodegraded product. A large peak appeared at about 3.1 minutes and had a shoulder. The first derivative of this peak should show that three components were present. The first two peaks indicated that nickel complexes were present and the remaining peaks indicated organic acids, phosphites and stabilizers. After 12 hours HPLC analysis shows that photolysis leads to two new components at 7 and 13.3 minutes as well as reductions in other components. Other wavelength photolysis showed the same general results with quantum yields (such as citric acid destruction) that are shown in the following Table 1.

TABLE 1

| Wavelength (nm) | Yield |
|---|---|
| 220 | 0.06 |

TABLE 1-continued

| Wavelength (nm) | Yield |
|---|---|
| 210 | 0.08 |
| 205 | 0.088 |
| 193 | 0.11 |
| 185 | 0.13 |

HPLC data shows that for a photolyses time period of 24 hours and at the indicated wavelengths in Table 1, that the shorter wavelengths are most favorable for nickel reduction.

As to the photolysis of Ni EDTA, and using HPLC analysis after 1 hour photolysis, two components were seen. An HPLC analysis of the sample after 1 hour photolysis and an injection of pure ethylene diamine triacetic acid was effected. Based on this chromatography, it is postulated that the primary photoproduct is the triacetic acid. After hours of photolysis, a single nickel component was seen, but it appears that at least two, and perhaps three, organic components were present. After six hours of photolysis, a single organic peak was seen. Based on this chromatography, it is postulated that a secondary photoproduct, namely, glycolic acid was formed, presumably from the photolysis of the triacetate formed in the primary photoprocess. Additional HPLC data taken of 1, 2 and 6 hour photolysis samples shows the nickel complex reduced, and the ethylenediamine triacetic acid and glycolic acids were produced. UV spectroscopy indicates 100 percent removal of nickel can be obtained by photolysis in 12 hours.

This data shows the photochemical destruction of both electroless nickel plating wastes and Ni-ETA complexes. In the case of Ni-EDTA, the mechanism of photochemical nickel removal is a first step that involves conversion of the chelate to a weaker chelate (EDTA to ethylene diamine triacetic acid), followed by pH precipitation of the nickel metal as the hydroxide. An added advantage of the photochemical destruction of electroless nickel plating waste is the conversion of orthophosphite (which is toxic) to phosphate.

After photolysis, the light intensely was determined using ferri-oxalate actinometry as described by Calvert & Pitts. The UV spectrum of the complexes was measured before and after photolysis. Nickel content was measured by EDTA titration using murexide indicator after chelation with ammonia. An aliquot of each photolyzed sample was separated and quantified.

Example 2

Ni EDTA

Additional photolyses was conducted on 0.01 M and $10^{-5}$ M aqueous solutions of $H_2Ni(EDTA)$ $OH_2$.

Photolysis of the 0.01 M aqueous solution at 185 nm with a low pressure mercury lamp leads to photofragmentation of the chelate through loss of $CO_2$ and glycolic acid to form ethylenediaminetriacetic acid and methylethylenediaminetriacetic acid chelating agents, according to product studies involving ion exchange chromatography, esterification, and spectroscopic ($^1$H NMR, FT 1R, and GC-MS) analyses of derivatives of the products.

Photolysis of the $10^{-5}$ M aqueous solution also undergoes photodegradation of the chelate at 185 nm.

All products observed within the first 5 min of the photolysis, except a minor one, largely disappeared within 23 min total time, to be replaced by a new group of photoproducts, which in turn were destroyed after a total of 3 hr. photolysis at 185 nm. This would indicate that practically all material was converted at this stage to $CO_2$, CO, formaldehyde, ammonia or methylamines (the latter of which would likely not have been detected under the analysis conditions). Like most of the products of 5 min photolysis, the group of products formed within 23 min had odd molecular weights. A major product of mass of 245 could be an ester derivative of a dipeptide comprised of an amino diacid and an amino acid; products incorporating a glycolate or formaldehyde unit appeared to be missing after 23 min photolysis, in contrast to the 5 photolysis.

The following represents photoproducts obtained on photolysis of the ($10^{-5}$M) of Ni(EDTA) 5 min

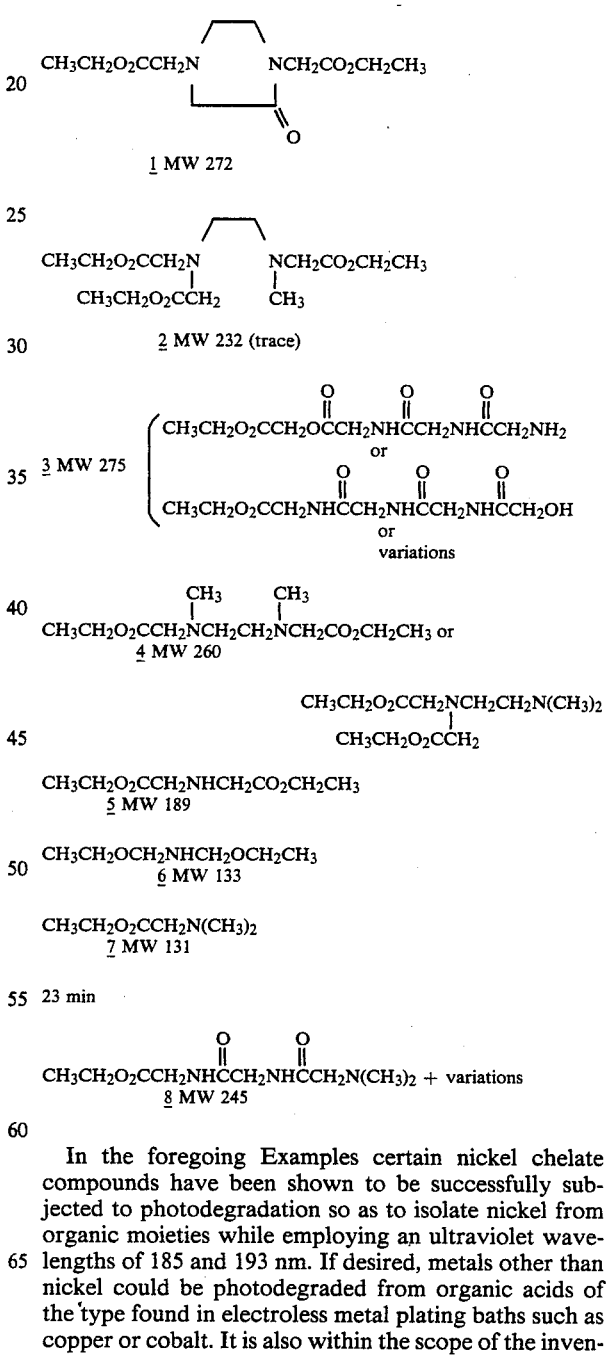

23 min $$CH_3CH_2O_2CCH_2NH\overset{O}{\overset{\|}{C}}CH_2NH\overset{O}{\overset{\|}{C}}CH_2N(CH_3)_2 + \text{variations}$$
<u>8</u> MW 245

In the foregoing Examples certain nickel chelate compounds have been shown to be successfully subjected to photodegradation so as to isolate nickel from organic moieties while employing an ultraviolet wavelengths of 185 and 193 nm. If desired, metals other than nickel could be photodegraded from organic acids of the type found in electroless metal plating baths such as copper or cobalt. It is also within the scope of the invention to photodegrade other metals from EDTA such as copper or cobalt from the EDTA chelate.

It should also be noted that in conjunction with Table 1 that increased activity of nickel removal begins at 210 nm UV wavelengths with respect to nickel plating baths. As is seen in conjunction with Example 2 a wavelength of 185 is optimal with respect to nickel EDTA. Accordingly, a wavelength of 200 nm is also optimal with respect to both the photodegradation of plating baths and EDTA.

In Example 1 an electroless plating bath is stated as containing the nickel chelated compounds. The photodegrading process of this invention can also be utilized to advantage when the metal chelated compounds are present in the rinse water from a plating bath.

A low pressure Hg arc lamp is stated as the source of UV light at 185 nm. In its place a laser could be used to effect a UV light source having a wavelength no greater than 210 nm. One which could supply sufficient power at the indicated wavelength would be of the ArF excimer type or an Nd-Yag laser.

We claim:

1. A method of photodegrading a metallic chelate complex comprising forming an aqueous solution of a metallic chelate and directing ultraviolet light into said solution to photodegrade the metallic chelate and isolate the metallic portion, said ultraviolet light having a wavelength of no greater than about 193 nm.

2. The method of claim 1 wherein the source of said ultraviolet light is a mercury lamp.

3. The method of claim 1 wherein the source of said ultraviolet light is a laser.

4. The method of claim 1 wherein the source of said ultraviolet light is an ArF excimer type laser.

5. The method of claim 1 wherein the source of said ultraviolet light is a Nd-Yag laser.

6. A method of photodegrading an aqueous electroless nickel plating bath containing nickel and organic acids comprising directing ultraviolet light into said plating bath, said ultraviolet light having a wavelength of no greater than about 193 nm to disassociate nickel from any linkage to an organic compound so as to permit said nickel to be recovered as a nickel ion or an inorganic compound.

7. The method of claim 6 wherein said wavelength is approximately 185 nm and is produced by a low pressure mercury arc lamp.

8. The method of claim 6 wherein said nickel is recovered by pH precipitation as nickel oxide or nickel hydroxide.

9. A method of photodegrading a metal ethylenediaminetriacetic acid comprising directing ultraviolet light into an aqueous solution of a metal ethylenediaminetetraacetic acid complex, said ultraviolet light having a wavelength of no greater than about 193 nm to disassociate the metal from said metal ethylenediaminetetraacetic acid and recovering said metal as a metallic ion or an inorganic compound.

10. The method of claim 9 wherein said metal is nickel.

11. The method of claim 9 wherein said wavelength is approximately 185 nm and is produced by a low pressure mercury ar lamp.

12. The method of claim 9 wherein said nickel is recovered by pH precipitation as nickel oxide or nickel hydroxide.

* * * * *

UNITED STATES PATENT AND TRADEMARK OFFICE
CERTIFICATE OF CORRECTION

PATENT NO. : 4,943,357

DATED : July 24, 1990

INVENTOR(S) : Van Antwerp et al.

It is certified that error appears in the above-identified patent and that said Letters Patent is hereby corrected as shown below:

Column 3 line 19    "hours" should read --2 hours--

Column 3 line 34    "Ni-ETA" should read --Ni-EDTA--

Column 4 line 13    "5" should read --5 min--

Column 6 line 31    "ar" should read --arc--
(Claim 11)

Signed and Sealed this

Thirty-first Day of December, 1991

Attest:

HARRY F. MANBECK, JR.

Attesting Officer    Commissioner of Patents and Trademarks